US011381050B2

(12) United States Patent
Hudek

(10) Patent No.: US 11,381,050 B2
(45) Date of Patent: Jul. 5, 2022

(54) LASER CAVITY OPTICAL ALIGNMENT

(71) Applicants: IonQ, Inc., College Park, MD (US);
University of Maryland, College Park, College Park, MD (US)

(72) Inventor: Kai Hudek, Hyattsville, MD (US)

(73) Assignees: IONQ, INC., College Park, MD (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 38 days.

(21) Appl. No.: 17/085,563

(22) Filed: Oct. 30, 2020

(65) Prior Publication Data
US 2021/0075180 A1 Mar. 11, 2021

Related U.S. Application Data

(62) Division of application No. 16/506,873, filed on Jul. 9, 2019, now Pat. No. 10,910,786.
(Continued)

(51) Int. Cl.
*H01S 3/02* (2006.01)
*G02B 27/10* (2006.01)
(Continued)

(52) U.S. Cl.
CPC .............. *H01S 3/025* (2013.01); *G02B 27/10* (2013.01); *H01S 3/0014* (2013.01); *H01S 3/10* (2013.01)

(58) Field of Classification Search
CPC .. G02B 26/007; G02B 26/023; G02B 5/3083; G02B 27/30; G02B 5/3025;
(Continued)

(56) References Cited

U.S. PATENT DOCUMENTS 5,080,482 A 1/1992 Benz et al.
5,481,202 A 1/1996 Frye
(Continued)

FOREIGN PATENT DOCUMENTS

GB 2545496 A * 6/2017 ............. G01R 1/073
GB 2546794 A * 8/2017 ........... G01R 1/0416
(Continued)

OTHER PUBLICATIONS

International Search Report and Written Opinion corresponding to International Application No. PCT/US2019/042982, dated Dec. 2, 2019.

*Primary Examiner* — Michael P Stafira
(74) *Attorney, Agent, or Firm* — ArentFox Schiff LLP

(57) ABSTRACT

The disclosure describes aspects of laser cavity optical alignment, and more particularly, in situ alignment of optical devices in an optical system for replacement or upgrade. In one aspect, a method for optical alignment in an optical system is described that includes providing, via a positioning system, an optical beam to measure surface features and position of a first device under test (DUT), removing the first DUT from the optical system, placing a second DUT in the optical system at substantially the same position from which the first DUT was removed, providing, via the positioning system, an optical beam to measure surface features and position of the second DUT, aligning the second DUT based on the measurements made of the first DUT and the second DUT, and verifying operation of the second DUT in the optical system. The DUT can be an optical device such as an output optical coupler.

20 Claims, 10 Drawing Sheets

Related U.S. Application Data

(60) Provisional application No. 62/702,142, filed on Jul. 23, 2018.

(51) Int. Cl.
*H01S 3/00* (2006.01)
*H01S 3/10* (2006.01)

(58) Field of Classification Search
CPC .............. G02B 6/29323; G02B 6/2938; G02B 21/0032; G02B 27/10; G02B 6/26; G02B 7/1827; G02B 21/002; G02B 21/0092; G02B 27/58; G02B 21/0004; G02B 21/14; G02B 6/122; G02B 6/29332; G02B 6/4214; G02B 6/02; G02B 6/02052; G02B 6/0208; G02B 6/43; G02B 6/12007; G02B 6/1223; G02B 2006/12121; G02B 5/28; G02B 5/285; G02B 5/288; G02B 5/289; G02B 6/0046; G02B 6/1228; G02B 6/264; G02B 6/4204; G02B 5/003; G02B 6/02076; G02B 6/12; G02B 6/4215; G02B 7/00; G02B 7/007; H01S 3/0014; H01S 3/025; H01S 3/10; H01S 3/1305; H01S 5/141; H01S 5/142; H01S 5/1032; H01S 5/146; H01S 5/4062; H01S 3/2383; H01S 5/021; H01S 3/1398; H01S 5/026; H01S 5/06804; H01S 5/0612; H01S 5/3412; H01S 5/4012; H01S 3/005; H01S 3/0078; H01S 5/14; H01S 5/4087; H01S 5/423; H01S 5/0683; H01S 5/0687; H01S 5/02251; H01S 5/02326; H01S 5/0014; H01S 5/0287; H01S 5/041; H01S 3/106; H01S 5/0617; H01S 5/1014; H01S 5/1021; H01S 5/1096; H01S 5/06213; H01S 5/143; H01S 5/343; H01S 3/0092; H01S 3/06791; H01S 3/0809; H01S 3/1106; H01S 3/1112; H01S 3/2391; H01S 5/0234; H01S 5/0264; H01S 5/0427; H01S 5/06832; H01S 5/12; H01S 5/125; H01S 5/18355; H01S 5/20; H01S 2301/02; H01S 5/0622; H01S 5/183; H01S 2301/166; H01S 3/10053; H01S 3/105; H01S 3/1055; H01S 3/109; H01S 3/23; H01S 5/02325; H01S 5/1039; H01S 5/18311; H01S 5/18388; H01S 3/06712; H01S 3/06716; H01S 3/06672; H01S 3/06729; H01S 3/06758; H01S 3/06766; H01S 3/0677; H01S 3/06775; H01S 3/1608; H01S 3/1616; H01S 5/0207; H01S 5/02415; H01S 5/06216; H01S 5/147; H01S 5/18383; H01S 5/18386; H01S 5/34313; H01S 5/36; H01S 2301/16; H01S 3/115; H01S 3/1394; H01S 5/00; H01S 5/0078; H01S 5/0607; H01S 5/06256; H01S 5/101; H01S 5/1017; H01S 5/1042; H01S 5/1071; H01S 5/18366; H01S 5/4031; H01S 5/50; H01S 2301/173; H01S 3/04; H01S 3/08045; H01S 3/10046; H01S 3/1062; H01S 3/1068; H01S 3/13; H01S 3/1307; H01S 3/137; H01S 3/139; H01S 5/005; H01S 5/02212; H01S 5/0288; H01S 5/0654; H01S 5/06821; H01S 5/22; H01S 3/05; H01S 3/063; H01S 3/0637; H01S 3/08068; H01S 3/083; H01S 3/094096; H01S 3/1083; H01S 3/1312; H01S 5/0028; H01S 5/02; H01S 5/02253; H01S 5/0267; H01S 5/0615; H01S 5/0653; H01S 5/1085; H01S 5/18; H01S 5/18397; H01S 3/08054; H01S 3/08072; H01S 5/0087; H01S 5/0202; H01S 5/0203; H01S 5/0215; H01S 5/0216; H01S 5/0217; H01S 5/0218; H01S 5/0265; H01S 5/04253; H01S 5/04256; H01S 5/04257; H01S 5/06; H01S 5/0614; H01S 5/062; H01S 5/0625; H01S 5/0657; H01S 5/0658; H01S 5/068; H01S 5/06808; H01S 5/06812; H01S 5/06835; H01S 5/10; H01S 5/18369; H01S 5/3402; H01S 5/34333; H01S 5/347; H01S 5/40; H01S 5/4025; H01S 5/4056; H01S 5/4093; H01S 5/42

See application file for complete search history.

(56) References Cited

U.S. PATENT DOCUMENTS

| | | |
|---|---|---|
| 2004/0233944 A1 | 11/2004 | Dantus et al. |
| 2006/0182154 A1 | 8/2006 | Riken |
| 2006/0215724 A1 | 9/2006 | Sesko |
| 2007/0002907 A1 | 1/2007 | Ell et al. |
| 2007/0070345 A1 | 3/2007 | Araragi et al. |
| 2007/0133931 A1 | 6/2007 | Lee et al. |
| 2008/0082288 A1* | 4/2008 | Raad .................... G01K 11/125 702/167 |
| 2009/0231593 A1 | 9/2009 | Freimann |
| 2011/0058248 A1 | 3/2011 | Vodopyanov et al. |
| 2011/0310497 A1 | 12/2011 | Ashcraft et al. |
| 2012/0043984 A1* | 2/2012 | Yashar .................. H01S 5/0014 324/754.11 |
| 2013/0293946 A1 | 11/2013 | Fermann et al. |
| 2017/0176520 A1* | 6/2017 | Kindereit .............. H01S 3/1305 |
| 2019/0042392 A1 | 2/2019 | Matsuura et al. |
| 2019/0280457 A1* | 9/2019 | Adams ................... G01M 11/33 |
| 2019/0363519 A1 | 11/2019 | Lochman et al. |

FOREIGN PATENT DOCUMENTS

| | | | |
|---|---|---|---|
| JP | 2001324309 A | * 11/2001 | |
| JP | 2012145569 A | * 8/2012 | |
| WO | WO-2012107782 A2 | * 8/2012 | ............ G01R 27/06 |
| WO | WO-2013188046 A1 | * 12/2013 | ............... G01R 1/07 |

* cited by examiner

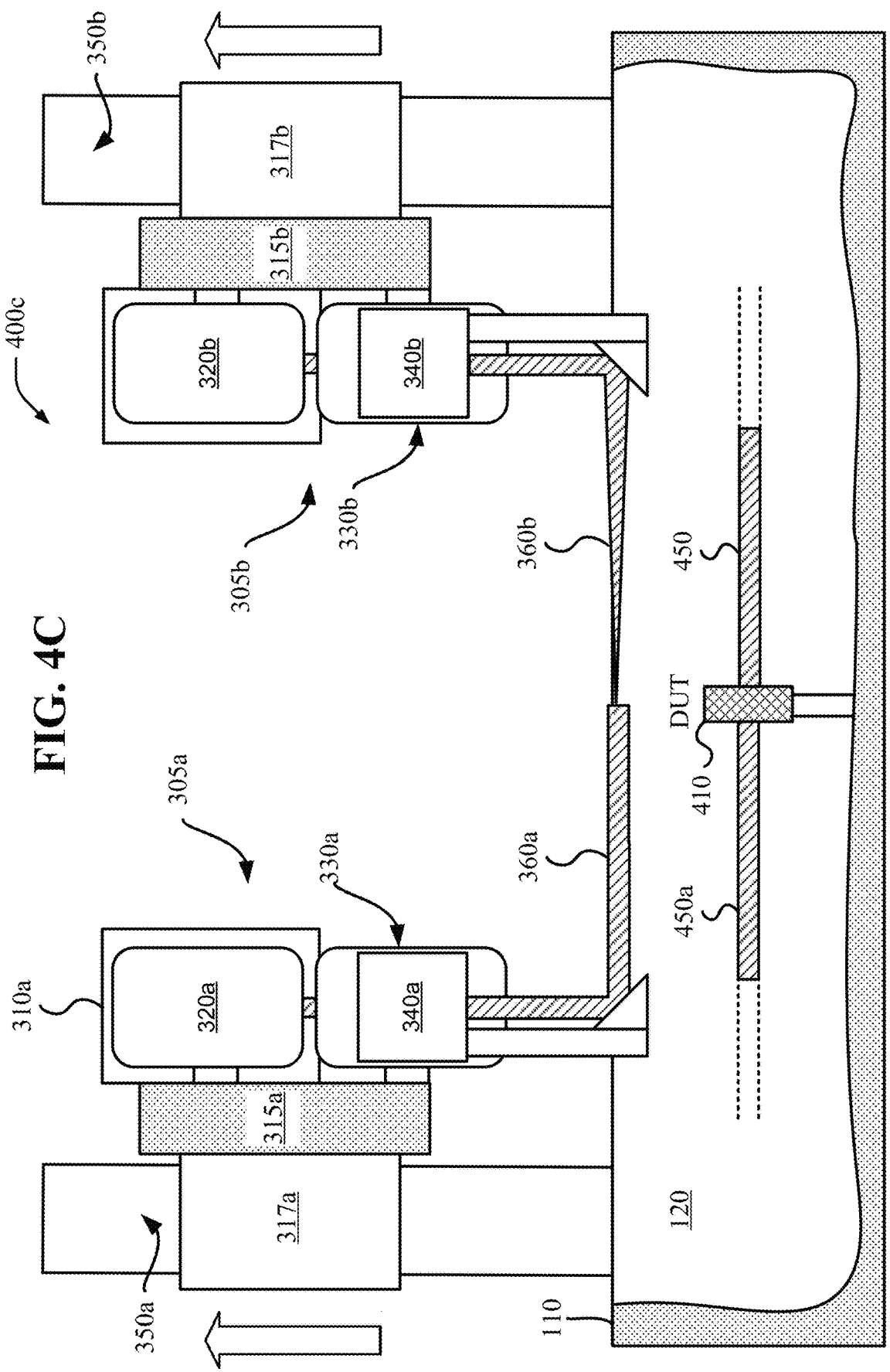

LASER CAVITY OPTICAL ALIGNMENT

CROSS REFERENCE TO RELATED APPLICATIONS

The present application is a DIVISIONAL application of U.S. application Ser. No. 16/506,873, entitled "LASER CAVITY OPTICAL ALIGNMENT," and filed on Jul. 9, 2019, which claims priority to and the benefit from U.S. Provisional Patent Application No. 62/702,142, entitled "LASER CAVITY OPTICAL ALIGNMENT," and filed on Jul. 23, 2018, the contents of which are incorporated herein by reference in their entirety.

GOVERNMENT LICENSE RIGHTS

This invention was made with government support under Award No. W911NF1610082 by IARPA. The government has certain rights in the invention.

BACKGROUND OF THE DISCLOSURE

Aspects of the present disclosure generally relate to laser cavity optical alignment, and more particularly, to in situ alignment of optical devices in an optical system for replacement or upgrade.

Quantum bits or qubits made by using trapped atomic ions is one of the quantum information processing (QIP) approaches that has delivered universal and fully programmable machines. Individually and globally addressable qubit transitions can be driven by the frequency comb generated by a train of pulses emitted by a mode-locked laser. The position of the comb lines in frequency space is important for effectively driving these transitions while cancelling out any unwanted transitions as well as minimizing systematics. The phase noise of the frequency comb can directly impact the qubit fidelity and needs to be suppressed.

Industrial lasers that typically service the semiconductor industry are the most advanced, reliable, and stable ultraviolet pulsed lasers available, benefiting greatly from the high-level of investment in that industry. The semiconductor industry, however, does not typically need lasers with the types of characteristics described above, especially to the high-precision levels needed for quantum computing.

Accordingly, devices or systems that can improve the characteristics of lasers for use in quantum information processing are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The present disclosure describes various aspects of modifying existing commercial or industrial lasers using metrology tools to accurately measure the position of optics that so that they can be removed and replaced while maintaining alignment of the laser. That is, a particular optical device can be removed and replaced without affecting the alignment of any of the other optical devices in the laser. The techniques described herein could be used more generally for any in situ optics metrology and replacement. Thus, the present disclosure describes techniques to measure the position of optical elements in order to modify these lasers or any other system, commercial or otherwise, that needs in situ optics replaced.

In an aspect of the present disclosure, a method for optical alignment in an optical system (e.g., within a laser cavity) is described that includes providing, via a positioning system, an optical beam to measure surface features and position of a first device under test (DUT), removing the first DUT from the optical system, placing a second DUT in the optical system at substantially the same position from which the first DUT was removed, providing, via the positioning system, an optical beam to measure surface features and position of the second DUT, aligning the second DUT based on the measurements made of the first DUT and the second DUT, and verifying operation of the second DUT in the optical system.

In an aspect of the present disclosure, an optical alignment system is described that includes a positional component having a laser input port configured to receive an optical beam, one or more alignment mirrors configured to redirect the optical beam to a beam splitter, the beam splitter configured to redirect the optical beam to a measurement tool probe, the measurement tool probe configured to redirect the optical beam to a DUT within an optical system, and a long travel translation stage configured to align the optical beam from the measurement tool probe with an axis of the DUT. The measurement tool probe is further configured to receive an output optical beam from the DUT, and the beam splitter is further configured to direct the output optical beam to an output of the positional component.

Each of the techniques described herein can be implemented to improve the performance of lasers used in a quantum information processing (QIP) system or apparatus. Moreover, as described above, each of these techniques can be more generally implemented as part of an automated system for testing, providing maintenance/refurbishing, and/or upgrading optical assemblies of different types and not just laser systems.

BRIEF DESCRIPTION OF THE DRAWINGS

The appended drawings illustrate only some implementation and are therefore not to be considered limiting of scope.

FIG. 4C is a diagram that illustrates an example with two positional components in a raised position in accordance with an aspect of this disclosure.

DETAILED DESCRIPTION

Figure 1A:
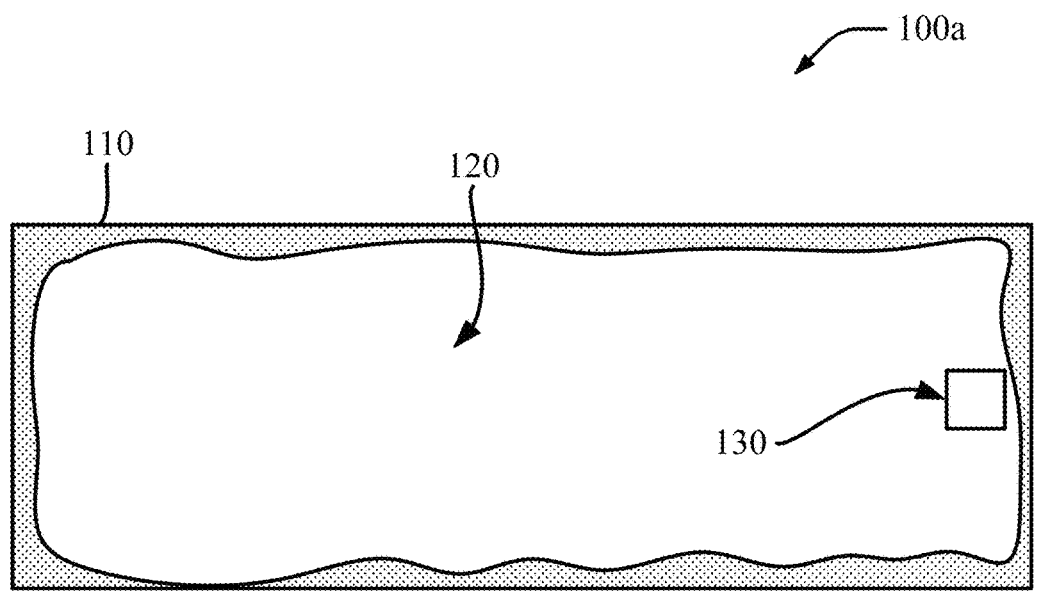
FIGS. 1A and 1B are diagrams that illustrate an example of an optical device that needs in situ replacement in a laser cavity in accordance with aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Industrial lasers or other high-end lasers can be used as reliable and stable ultra-violet (UV) pulsed lasers (e.g., mode-locked lasers). These lasers, however, are not generally configured to provide the kind of laser characteristics and high-precision levels needed for quantum computing applications performed in, for example, trapped-ion quantum computers or quantum information processing (QIP) systems. For example, as pressure changes, or as temperature changes, the effective cavity length of the laser changes as well. The fidelity of the quantum gates being implemented in a quantum algorithm or simulation depends on the ability to have a tuned, stable laser output, which conventional industrial lasers may not be able to provide because of these environmental changes. Accordingly, for quantum computing applications, it is necessary to rapidly track these changes and provide some form of feedback to stabilize the laser's output.

Another issue that may arise in industrial lasers is the coupling of mechanical vibrations and/or resonances, which may limit the operating bandwidth needed for a pulsed laser to be effectively used for quantum computing applications.

One approach to address the issues mentioned above is to replace existing optical components or devices that are unable to provide the type of tuning or bandwidth that is needed with a mechanical assembly having a transducer or other similar device with which to control relevant spacing within the cavity of the laser in order to have better control of the repetition rate or rep rate of the laser, and thereby have better control of the frequency comb (teeth) in the frequency domain of a pulsed laser. The repetition rate may need to be stabilized to less than a part per billion (may be even a part per trillion). In a mode-locked laser, the repetition rate may refer to the number of pulses produced by the laser in a specific time unit. Mode-locking is used to produce pulses of light of extremely short duration, on the order of picoseconds or femtoseconds, by inducing a fixed-phase relationship between the longitudinal modes of the laser's resonant cavity, while constructive interference between these modes causes a train of pulses to be generated. When this happens, the laser is said to be "mode-locked" (or "phase-locked"). A type of laser that can be used as a mode-locked laser can be a solid-state laser such as a crystal-based Nd:YAG (neodymium-doped yttrium aluminum garnet) laser, simply referred to as a YAG laser or a Ti:Sapp (titanium-doped sapphire) laser, or a fiber-based laser using erbium-doped fiber as the gain medium.

Moreover, the mechanical assembly may be configured to provide a high-bandwidth operation by mechanically decoupling surrounding environmental vibrations and/or damping certain resonances while reducing the gain and increasing the frequency of other resonances.

This is one example where an optical device may need to be replaced with an improved or enhanced optical device in situ to avoid misaligning any of the other optical devices in the laser. Similar issues may arise when replacing outdated, damaged, or degraded optical devices with the same or similar optical devices, or as part of an automated testing of optical assemblies.

Additional details regarding the various techniques described herein for laser cavity optical alignment are provided below in connection with FIGS. 1A-7.

Figure 1B:
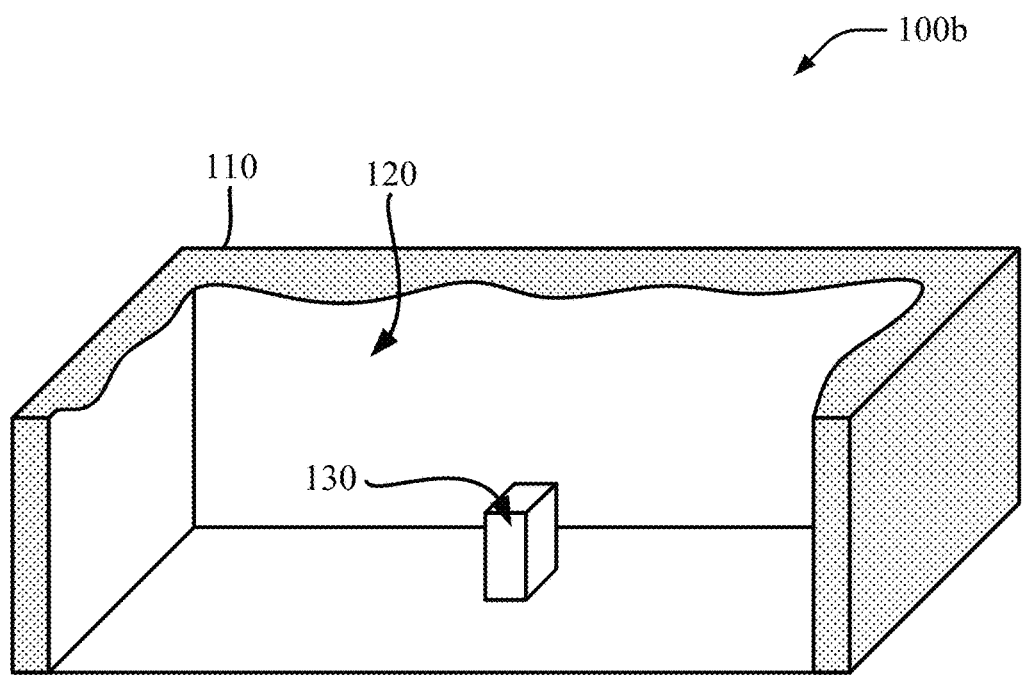

FIG. 1A shows a diagram 100a that illustrates an example of an optical component or optical device 130 within a laser cavity 120 in accordance with aspects of this disclosure. The optical component or optical device 130 may be a single optical component, an optical assembly, an mechanical assembly (e.g., an opto-mechanical assembly), or any component or device configured to change a physical characteristic of laser or optical beam. In the diagram 100a, a partial view inside a laser 110 is shown to illustrate the laser cavity 120 and positioning of the optical device 130 within the laser cavity 120. FIG. 1B shows a diagram 100b that illustrates another partial view of the position of the optical device 130 within the laser cavity 120. The laser 110 can be a pulsed laser (e.g., a mode-locked or phase-locked laser) such as a YAG laser, for example. The laser 110 can be used to produce one or more optical beams for quantum computing operations or quantum information processing, and consequently, the output of the laser 110 may be used to drive individual and global addressable qubit transitions with the frequency comb generated by a train of pulses emitted by the laser 110. As described above, the position of the comb lines in frequency space is important for effectively driving these transitions while cancelling out any unwanted transitions as well as minimizing systematics. The phase noise of the frequency comb can directly impact the qubit fidelity and needs to be suppressed.

The position of the optical device 130 in the diagram 100a is provided by way of illustration and not of limitation. Accordingly, the optical device 130 may be placed within the laser 110 in a position that is suitable for its operation. When the optical device 130 is an output optical coupler, for example, the optical device 130 may be positioned or placed to couple an optical beam to an output of the laser 110. Moreover, the laser cavity 120 is intended to illustrate the inner portions of the laser 110 and may include significantly more components (not shown) other than the optical device 130. Such components may be aligned optically and that alignment is to be preserved. For purposes of this disclosure, a cavity length (or a length of a cavity) need not represent a physical dimension of the laser 110 or the laser cavity 120, but may instead refer to an optical path within the laser cavity 120. A cavity length may also be referred to as an optical cavity, a resonating cavity, or an optical resonator, and includes an arrangement of mirrors or other optical elements that forms a standing wave cavity resonator for light waves. The cavity length may therefore be defined, at least in part, by the position of the optical device 130, and any adjustments that may be needed to the cavity length can therefore be accomplished by making adjustments to the optical device 130 as described herein. As such, if the optical device 130 needs to be removed and replaced, it is important that its replacement be carefully positioned, for example, having sensitivities of <1 nm linear translation, <1 mrad of rotation, and ~0.01 mrad of tip/tilt.

Figure 2A:
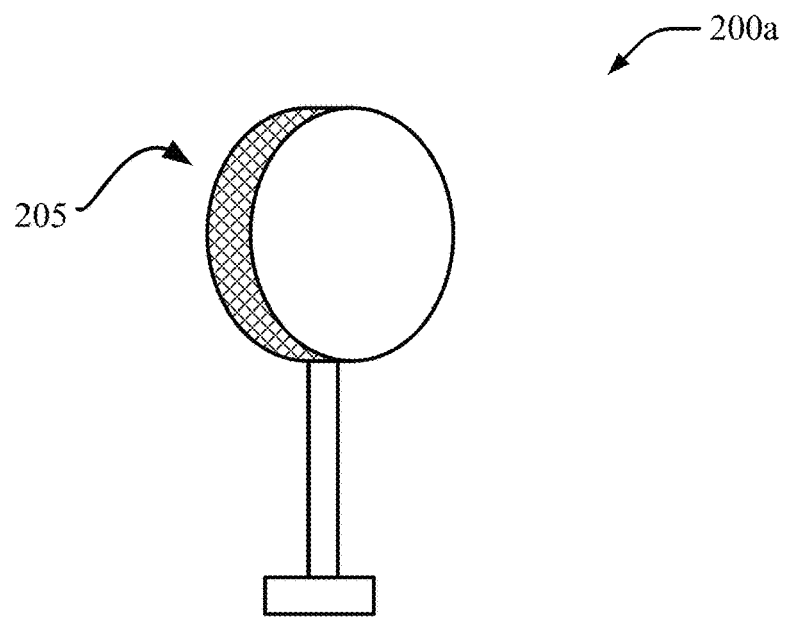
FIGS. 2A and 2B are diagrams that illustrate output optical coupler replacement in accordance with aspects of this disclosure.

FIG. 2A shows a diagram 200a that illustrates an output optical coupler 205, which can be an example of the optical device 130 in FIGS. 1A and 1B. The output optical coupler 205 may be a simple optical device (e.g., a mirror) with limited functionality. For example, the output optical coupler 205 may not have the ability to adjust its position to compensate for the effect that environmental changes can have on the laser cavity 120, and therefore, on the fidelity of the quantum gates to be implemented. The output optical coupler 205 may need to be replaced or upgraded from within the laser cavity 120 with a replacement optical device that provides additional functionalities, such as the ability to dynamically adjust its position to better track changes in the optical cavity of the laser 110 (e.g., a device having multiple degrees of freedom for adjustment). Moreover, the output optical coupler 205 may need to be replaced without removing or misaligning any of the other optical devices or components that are within the laser cavity 120 while also ensuring that the replacement optical device is properly positioned where the output optical coupler 205 used to be for effective operation of the laser 110. There may be instances in which the output optical coupler 205 is merely removed and replaced with a similar optical device because the output optical coupler 205 is damaged, degraded, or obsolete, for example. In other instances, as described above, the output optical coupler 205 is replace with a device that enhances the overall functionality of the system.

Figure 2B:
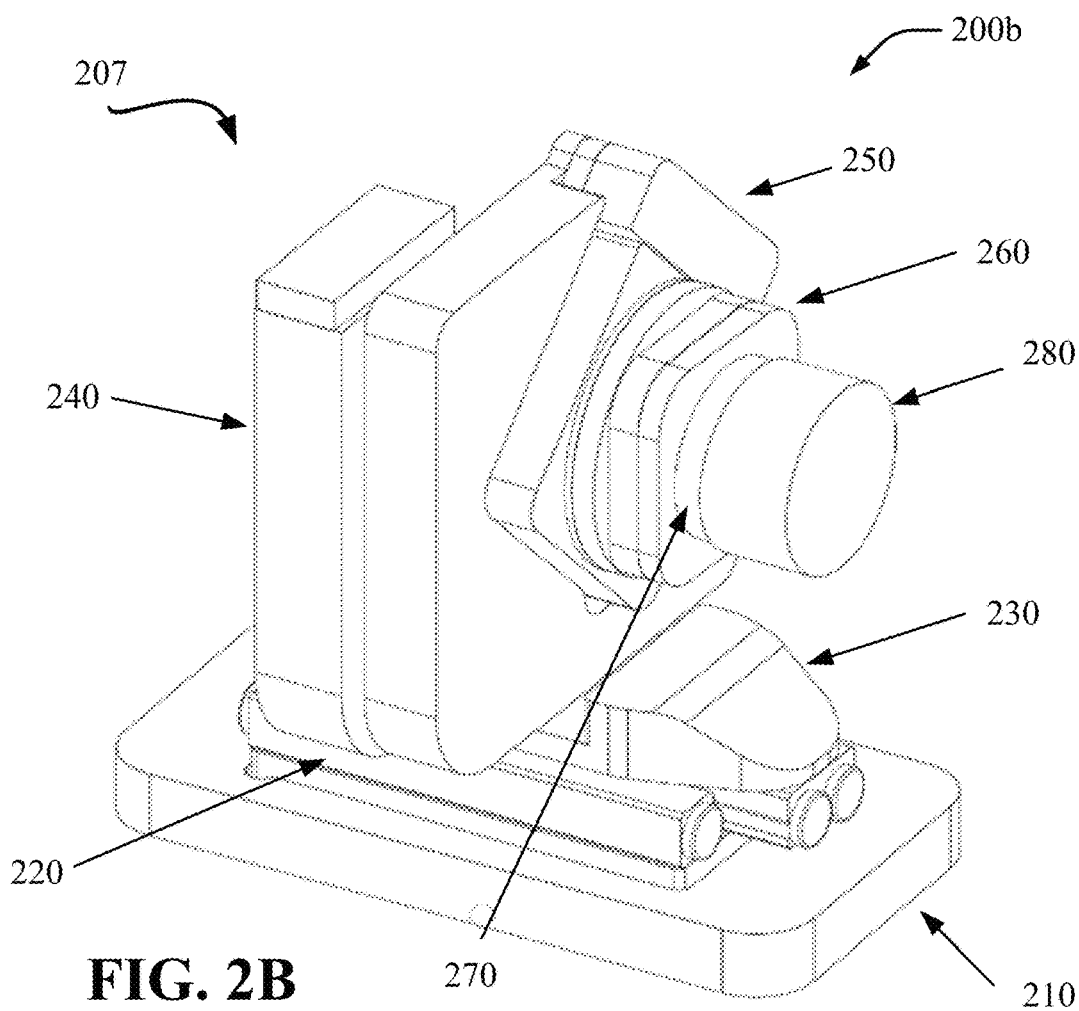

FIG. 2B shows a diagram 200b that illustrates an isometric view of an output optical coupler 207 that can be used to replace or upgrade the output optical coupler 205 shown in the diagram 200a in FIG. 2A. The mounting structure of the output optical coupler 207 may include a base plate 210, a linear stage 220, a stage connector plate 230, a tip-tilt mirror mount 240, a rotation stage 250, a piezo connector stage 260, a piezoelectric transducer (piezo) 270, and a cavity output coupler mirror 280.

The base plate 210 is a laser-appropriate plate to mechanically and rigidly couple or connect the output optical coupler to the laser (e.g., the laser 110). That is, the base plate 210 is physically attached to a flat portion inside the laser cavity 120. The linear stage 220 provides a long, precise travel along one or more directions (e.g., lateral plane, horizontal plane, or vertical plane) allowing for full control of the frequency comb spectrum with respect to a trapped-ion qubit (or multiple trapped-ion qubits) for a target application. The stage connector plate 230 mounts the tip-tilt mirror mount 240 and the rotation stage 250 to the linear stage 220. This arrangement or configuration enables all the positional degrees of freedom (DOFs) necessary for in situ optimization, which includes scanning of the frequency and optimization of power droop and drift. For example, the cavity output coupler mirror 280 can be linearly translated, rotated, and/or tilted to obtain an optimal position. In some instances, the sensitivities can be of <1 nm linear translation, <1 mrad of rotation, and ~0.01 mrad of tip/tilt.

The piezo connector stage 260 is mounted to the structure described above and allows for the ex situ mounting of the piezo 270 and the cavity output coupler mirror 280, which may be mounted as part of a high-bandwidth locking assembly. The high-bandwidth locking assembly may be configured to have both the pressure and corresponding frequency response controlled.

Each of the linear stage 220, the tip-tilt mirror mount 240, and the rotation stage 250 can be implemented using a piezoelectric actuator or a motor-driven actuator. Accordingly, each of the linear stage 220, the tip-tilt mirror mount 240, and the rotation may be provided with one or more control signals to control a respective positional degree of freedom, where the individual control signals may collectively provide the appropriate positioning of the cavity output coupler mirror 280 to enable laser cavity repetition rate tuning.

Therefore, the output optical coupler 207 may provide additional positional degrees of freedom compared to the output optical coupler 205, which allows the output optical coupler 207 to be used in a laser that allows for adjustments to maintain a high degree of fidelity of quantum gates (e.g., repetition rate tuning).

Figure 3A:
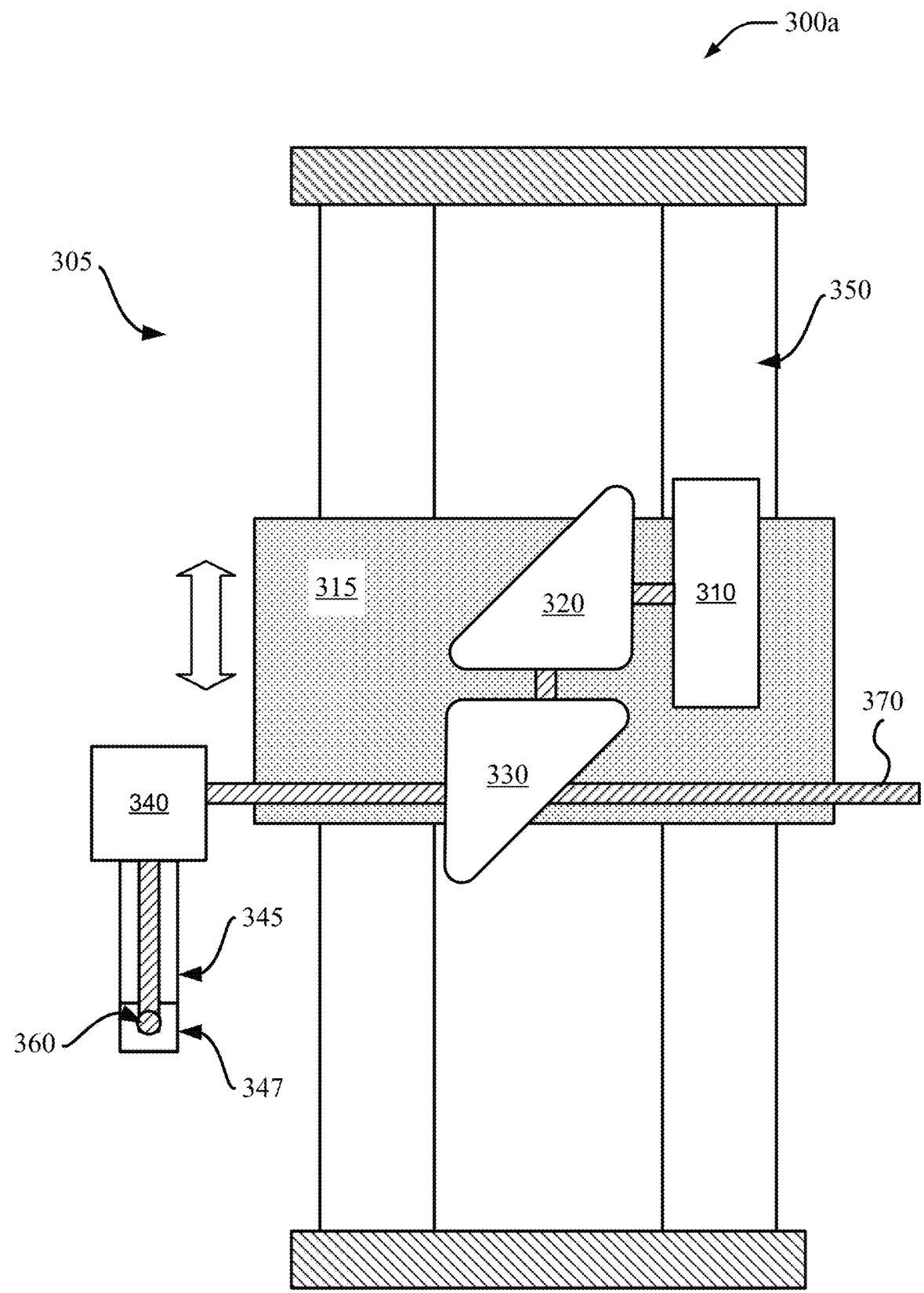
FIGS. 3A and 3B are diagrams that illustrate different views of an example of a positional component in a positional or alignment system in accordance with aspects of this disclosure.
Figure 3B:
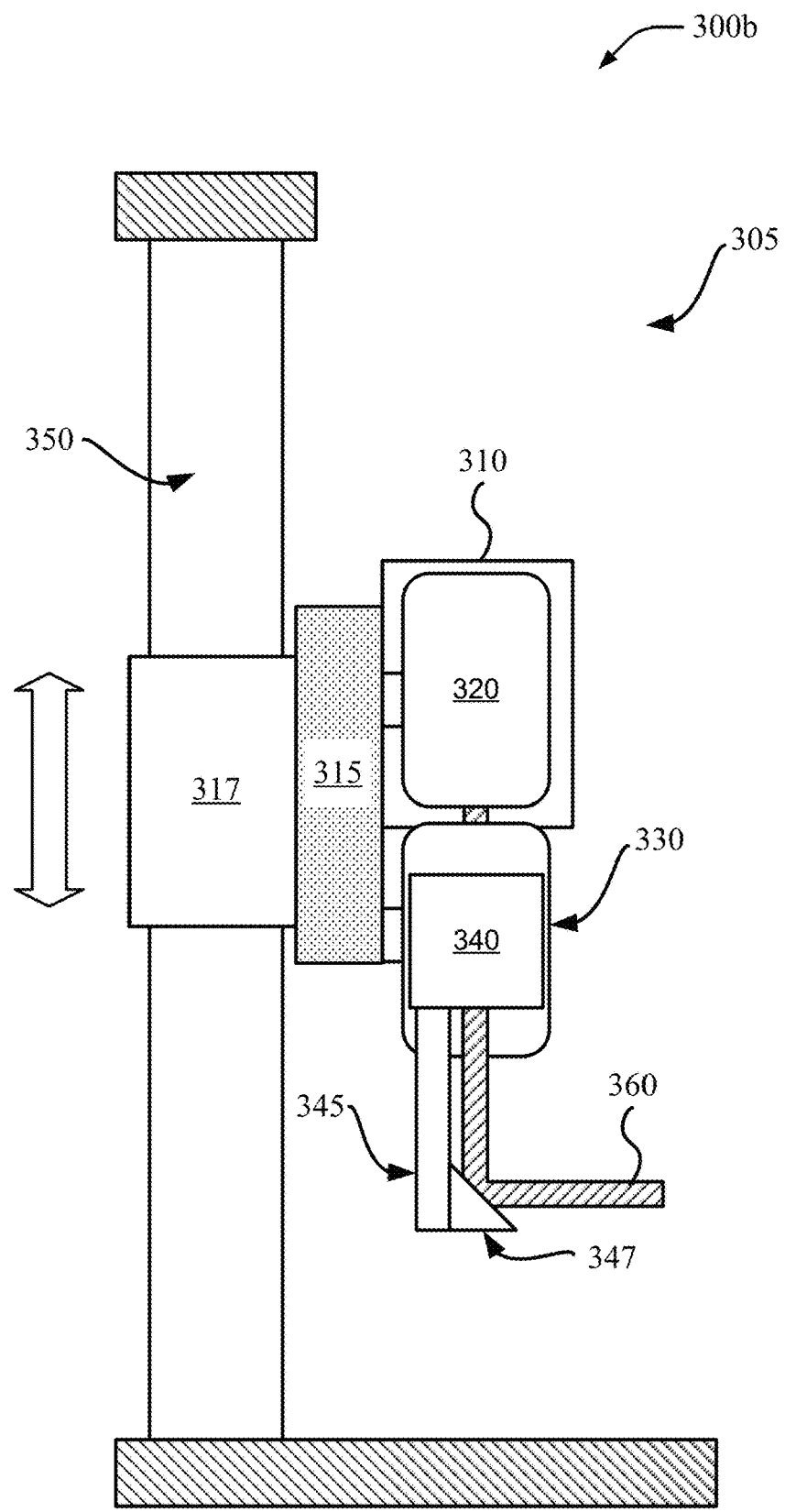

FIGS. 3A and 3B show diagrams 300a and 300b, respectively, that illustrate different views of an example of a positional component 305 that is part of a positional or alignment system used for optical alignment operations. The diagram 300a provides a side view of the positional component 305 and the diagram 300b provides a front view of the positional component 305. In an example, the positional component 305 may include a laser input port 310 configured to receive an optical beam (e.g., from a coupled optical fiber or from free space), one or more alignment mirrors 320 configured to redirect the optical beam to a beam splitter 330, which in turn redirects the optical beam to a measurement tool probe arm 340. The one or more alignment mirrors 320 can provide various degrees of freedom (DOF) for alignment.

The wavelength(s) of the optical beam received by the laser input port 310 may be on an appropriate value to measure the characteristics of a particular device or optics under test (e.g., optical device to be removed and replaced). The laser input port 310, the alignment mirrors 320, and the beam splitter 330 can be mechanically coupled to a platform or plate 315 that moves along a long travel translation stage 350 (e.g., moves vertically, up or down) to allow for the precise positioning of the probing optical beam 360. The diagram 300b shows a sliding component 317 to which the plate 315 is attached and that can move up or down along the long travel translation stage 350. The long travel translation stage 350 may use an actuator, motor, or some other mechanism (e.g., manual adjustment, indexing) to change the position of the sliding component 317 and, therefore, change the position of the probing optical beam 360. In some implementations the measurement tool probe arm 340 may be in direct mechanical coupling to the plate 315.

The measurement tool probe arm 340 can have a vertical arm 345 and a mirror 347 to redirect the probing optical beam 360 in the direction of a device or optics under test (not shown). The measurement tool probe arm 340 can be customized to a particular system of interest and/or to a particular optical device. That is, there may be different versions of the measurement tool probe arm 340, each of which is used for the removal and replacement of a particular optical device in a particular optical system. Each of these different measurement tool probe arms 340 can therefore be removably attached to the other parts of the positional component 305 depending on the application. Moreover, the measurement tool probe arm 340 can be configured to enable adjusting one or more positional degrees of freedom and/or angular position of the positioning system to place the probing optical beam 360 on a same axis as a device under test.

The probing optical beam 360 can be a collimated optical beam (e.g., produced by an autocollimator) which is used to measure angular displacement or a focused optical beam (e.g., produced by focusing optics) which is used to measure displacement along an axis (e.g., horizontal displacement). In one example, the collimated optical beam may be used to measure surface features such as surface curvature, angle, and/or tilt. In another example, the focused optical beam may be used to measure position (e.g., distance). In some implementations, the positional component 305 may use both collimated optical beams and focused optical beams by using polarization techniques to split the two optical beams out.

The probing optical beam 360 probes or measures the device under test and is reflected back through the measurement tool probe arm 340 and the beam splitter 330 to produce an output optical beam 370 that includes information regarding the probing or measuring of the device under test. The output optical beam 370 may then be provided to a detector or sensor (e.g., a quadrant or position detector, camera, etc.) in order to detect, process, and analyze the information in the output optical beam 370.

Figure 4A:
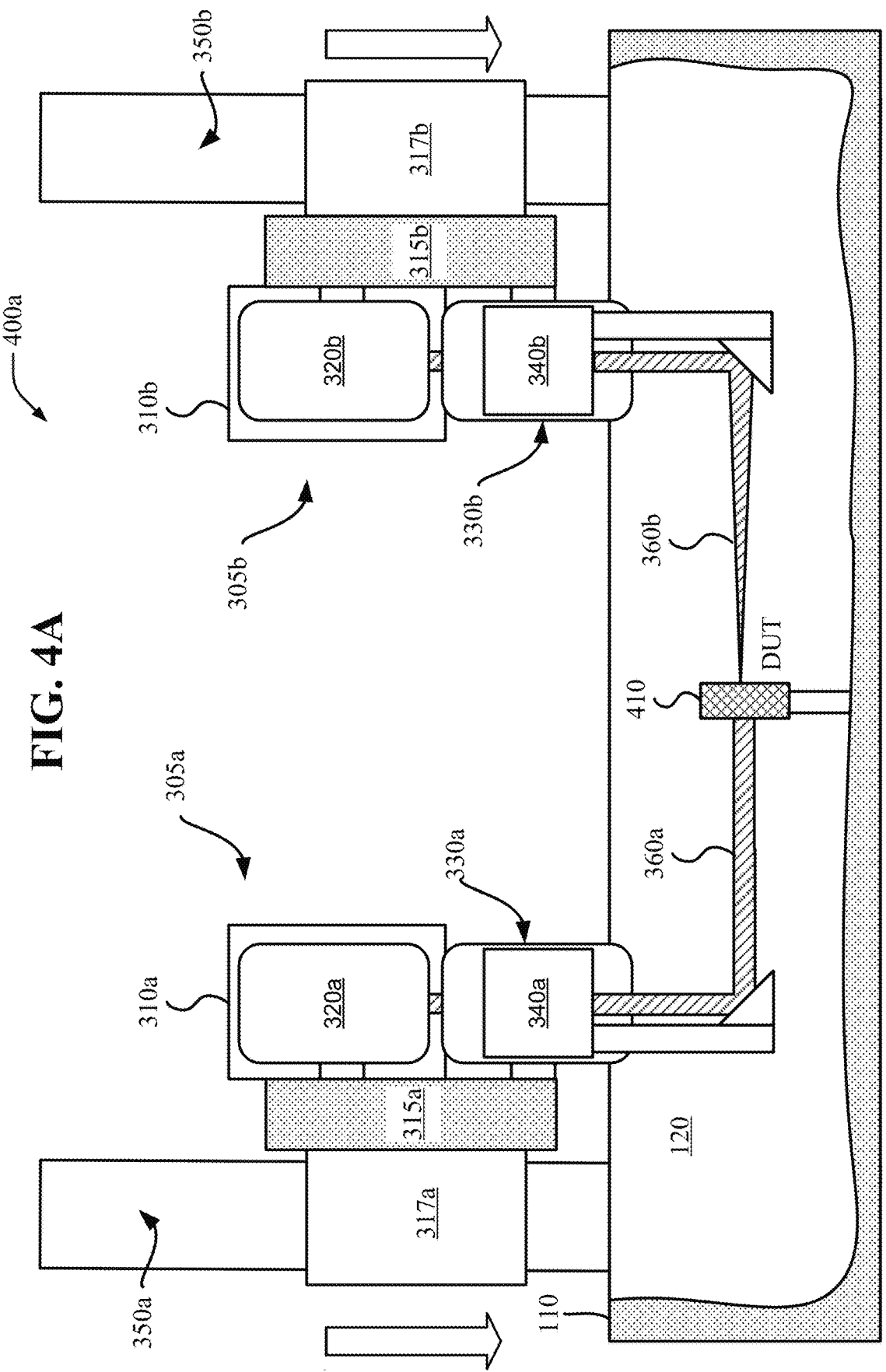
FIG. 4A is a diagram that illustrates an example of using two positional components in accordance with an aspect of this disclosure.

FIG. 4A shows a diagram 400a that illustrates an example of having a positional or alignment system that uses two positional components 305. In this example, a first positional component 305a is shown on the left side of the figure, including a laser input port 310a, one or more alignment mirrors 320a, a beam splitter 330a, a measurement tool probe arm 340a, a plate 315a, a sliding component 317a, and a long travel translation stage 350a. Also in this example, a second positional component 305ba is shown on the right side of the figure, including a laser input port 310b, one or more alignment mirrors 320b, a beam splitter 330b, a measurement tool probe arm 340b, a plate 315b, a sliding component 317b, and a long travel translation stage 350b.

The first positional component 305a and the second positional component 305b may be used to probe or measure multiple faces and degrees of freedom of an optical device under test (DUT) 410, also referred to as a optics under test (OUT) or an optical device under test (ODUT). The first positional component 305a may generate or provide a probing optical beam 360a that is collimated to measure various surface features (e.g., tip and tilt angles) of one surface or side of the DUT 410. The second positional component 305b may generate or provide a probing optical beam 360b that is focused onto an opposite surface or side of the DUT 410 and used to determine an exact position (e.g., axial position) of the DUT 410 within the laser cavity 120 of the laser 110.

As illustrated in the diagram 400a in FIG. 4A, both the first positional component 305a and the second positional component 305b are in a lowered position to allow the probing optical beams 360a and 360b to align with the DUT 410 to accurately measure the characteristics of the DUT 410.

With the information (e.g., probing, measurement) gathered by the probing optical beams 360a and 360b, it is possible to determine the exact arrangement of the DUT 410 so that a replacement device can be positioned in the same exact arrangement to ensure that the replacement device will perform in the same manner with other optical components within the cavity 120 of the laser 110 that are in alignment with the DUT 410.

Figure 4B:
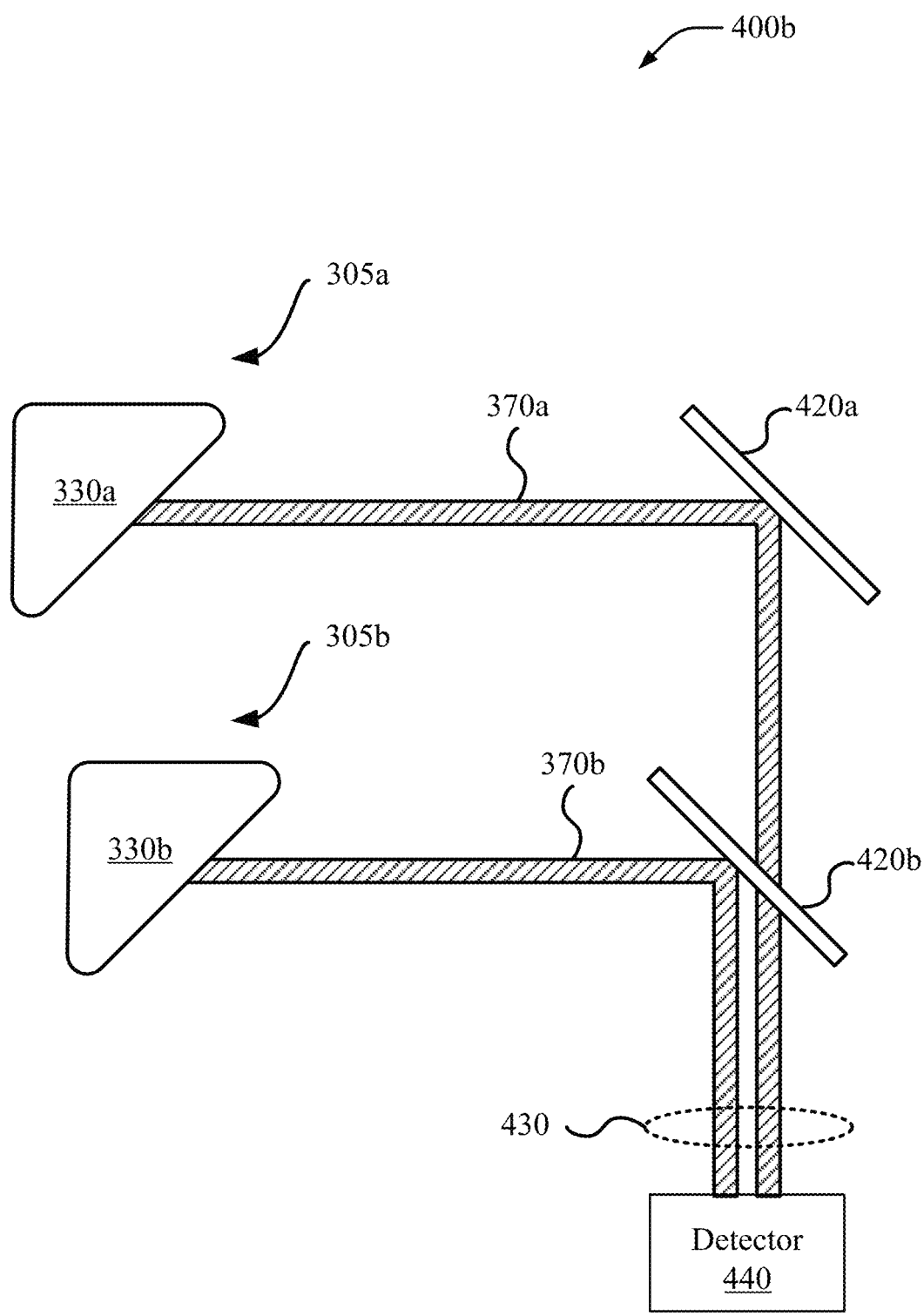
FIG. 4B is a diagram that illustrates an example of combining the outputs from two positional components in accordance with an aspect of this disclosure.

FIG. 4B shows a diagram 400b that illustrates an example of combining output optical beams from the first positional component 305a and the second positional component 305b. In this example, the probing optical beam 360a in the diagram 400b is reflected back from the DUT 410 through the measurement tool probe arm 340a (not shown) and the beam splitter 330a (shown) to provide an output optical beam 370a that can be redirected by a mirror 420a (or similar optical device) to a detector 440 (e.g., a quadrant or position detector, camera, etc.). Similarly, the probing optical beam 360b in the diagram 400b is reflected back from the DUT 410 through the measurement tool probe arm 340b (not shown) and the beam splitter 330b (shown) to provide an output optical beam 370b that can be redirected by a mirror 420b (or similar optical device) to the detector 440. The mirror 420b can be partially transmissive to allow the output optical beam 370a to be provided to the detector 440 adjacent to, or combined with, the output optical beam 370b, as shown by the co-directed output optical beams 430.

FIG. 4C shows a diagram 400c that illustrates an example with the first positional component 305a and the second positional component 305b in a raised position. In this example, the positional or alignment system allows in situ and active alignment of the DUT 410. For example, the first positional component 305a and the second positional component 305b both sit outside or above the DUT 410, so as not to interfere with operation. The long travel translation stages 350a and 350b allow for motion into (lowered position) and out of (raised position) the DUT 410 while maintaining optical alignment. This then allows normal operation within the optical cavity (e.g., the laser cavity 120) to test and optimize alignment without losing track of the original optic placement.

In one example, it is possible to bring the first positional component 305a and the second positional component 305b to their lowered positions to align with the DUT 410 and probe or measure the DUT 410. The first positional component 305a and the second positional component 305b can then be moved to their raised positions and operation of the DUT 410 can be verified. The DUT 410 can then be removed and replaced by a new DUT, which may have the same or more functionalities than the DUT 410 being replaced. The first positional component 305a and the second positional component 305b can be moved to their lowered positions to probe or measure the new DUT to compare its measurements with those of the DUT 410 and adjust the new DUT until the two compare favorably. The first positional component 305a and the second positional component 305b can then be moved to their raised positions and operation of the new DUT can be verified (e.g., that the operation of the new DUT in the laser 110 is within expected tolerances). If verification is passed, then the removal and replacement is complete, otherwise additional adjustments (e.g., with or without additional probing or measuring) may be performed until verification is successful.

The DUT 410 can be, for example, an optical device with good specular reflection surfaces. It is to be understood, however, that the DUT 410 can also be an optical device that is at least partially transmissive as long as there is some reflectivity of the probing optical beams.

Some variations of these techniques described below. For example, multiple inputs (e.g., multiple input optical beams) can be used to combine the features described in connection with FIGS. 4A, 4B, and 4C. It may also be possible to integrate a position sensitive detector (e.g., the detector 440) with sacrificed detection sensitivity. In addition to the alignment techniques described, various translation stages, rotation stages, and/or goniometers (e.g., an instrument that measures an angle or allows an object to be rotated to a precise angular position) may be used. As described above, the techniques for laser cavity optical alignment can also be used in a larger system for automated testing of optical assemblies. Moreover, although specific implementations of the first positional component 305a and the second positional component 305b are described, these components can be modified to be highly integrated, combinable, and/or customizable by using, for example, three-dimensional (3D) printing of the various components.

Figure 5:
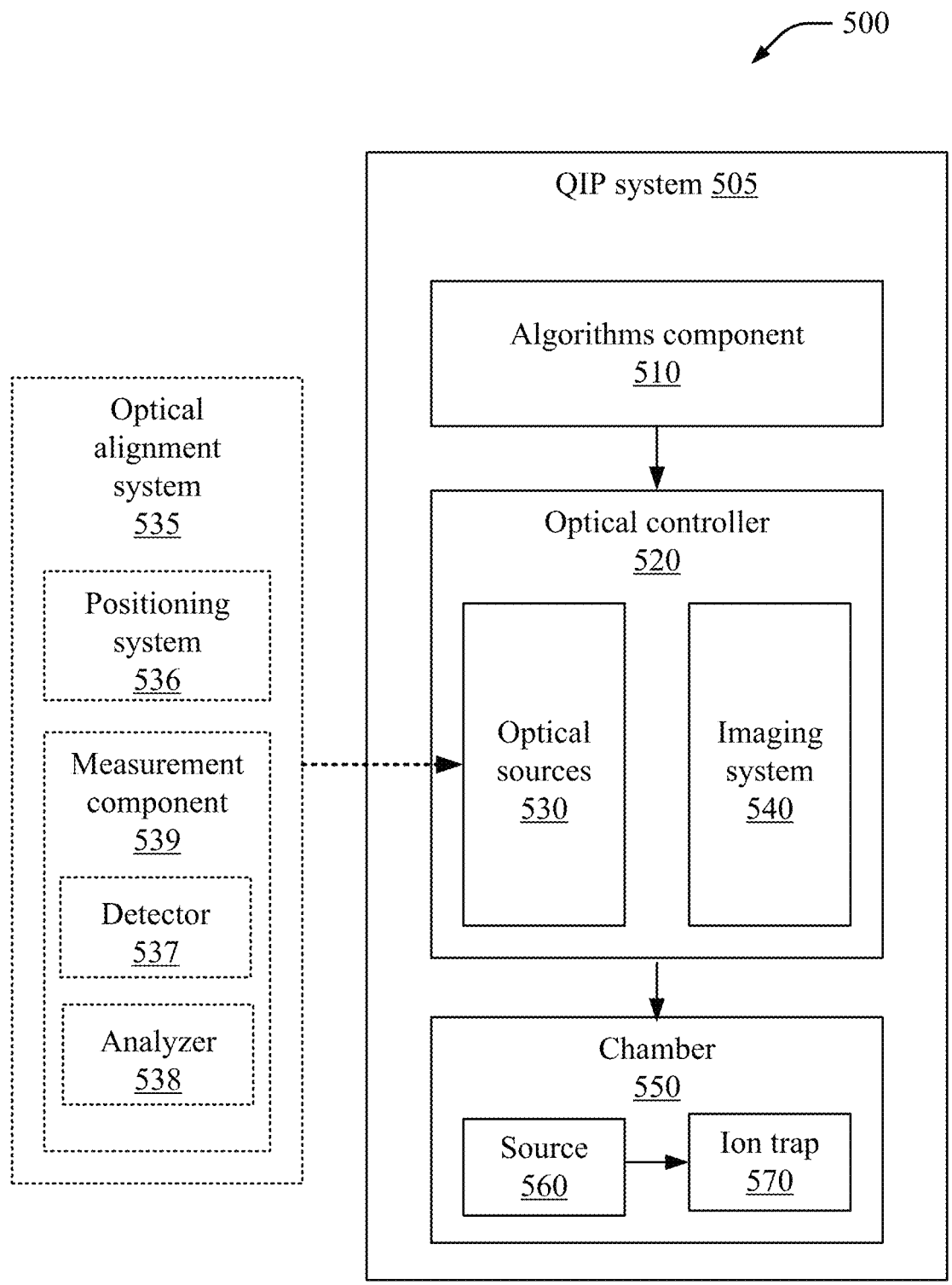
FIG. 5 is a block diagram that illustrates an example of a trapped-ion-based QIP system for which laser cavity optical alignment can be performed in accordance with aspects of this disclosure.

FIG. 5 shows a diagram 500 with an example of a QIP system 505 in accordance with aspects of this disclosure. The QIP system 505 may also be referred to as a quantum computing system, a quantum computing network, a computer device, or the like. In an aspect, the QIP system 505 may be used to implement or perform quantum computing operations, algorithms, or simulations for which the fidelity of the quantum gates being implemented depends on the ability to have a tuned, stable laser output applied to, for example, trapped ions used as quantum bits. The QIP system 505 may correspond to a quantum computer implementation of the computer device 600 in FIG. 6.

The QIP system 505 can include a source 560 that provides atomic species to a chamber 550 (e.g., a vacuum chamber) having an ion trap 570 that traps the atomic species (e.g., trapped ions) once ionized by an optical controller 520. The source 560 need not be part of the chamber 550 and may be implemented outside the chamber 550. Optical sources 530 in the optical controller 520 may include one or more laser sources that can be used for ionization of the atomic species, control (e.g., phase control) of the atomic ions, for fluorescence of the atomic ions that can be monitored and tracked by image processing algorithms operating in an imaging system 540 in the optical controller 520, and/or for other aspects including those described above.

The imaging system 540 can include a high resolution imager (e.g., CCD camera) for monitoring the atomic ions while they are being provided to the ion trap 570 (e.g., for counting) or after they have been provided to the ion trap 570 (e.g., for monitoring the atomic ions states). In an aspect, the imaging system 540 can be implemented separate from the optical controller 520, however, the use of fluorescence to detect, identify, and label atomic ions using image processing algorithms may need to be coordinated with the optical controller 520.

The QIP system 505 may also include an algorithms component 510 that may operate with other parts of the QIP system 505 (not shown) to perform quantum algorithms (e.g., QFT, quantum simulations) that make use of the implementations described above. The algorithms component 510 may provide instructions to various components of the QIP system 505 (e.g., to the optical controller 520) to enable the implementation of quantum circuits, or their equivalents. That is, the algorithms component 510 may allow for mapping of different computing primitives into physical representations using, for example, the trapped ions in the ion trap 570 as qubits.

Also shown in the diagram 500 is an optical alignment system 535 configured to perform various aspects of the techniques described herein for laser cavity optical alignment. The optical alignment system 535 may include a positioning system 536 that can have one or more positional components 305. The optical alignment system 535 can also have a measurement component 539 that includes a detector 537 (e.g., the detector 440) and an analyzer 538 configured to further process the information obtained from the detector 537 in order to ensure that a replacement optical device is properly aligned and positioned.

The optical alignment system 535 can be used to align optical components in one or more laser sources in the optical sources 530 of the optical controller 520. For example, in an implementation, the optical sources 530 in the optical controller 520 can include a mode-locked laser (or some form of pulsed laser) and a mode-locked laser controller (neither is shown). The mode-locked laser can have an output optical coupler, such as the output optical coupler 205 described above in connection with FIG. 2A, which can then be removed and replaced in the mode-locked laser by the output optical coupler 207 in FIG. 2B. The mode-locked laser controller can then be used to perform detection and feedback control the positional degrees of freedom of the output optical coupler 207 to ensure the frequency comb spectrum produced by the mode-locked laser is appropriate for quantum computing operations. It is to be understood that similar replacement techniques may be used with other types of optical components that may be removed and replaced without disturbing the other components in the laser cavity.

Figure 6:
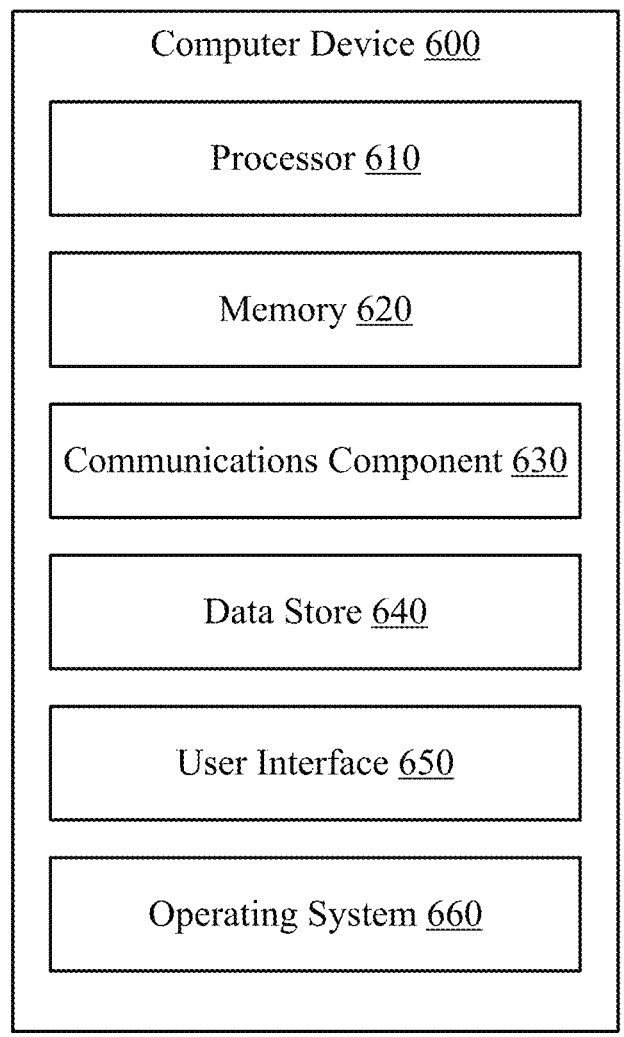
FIG. 6 is a diagram that illustrates an example of a computer device in accordance with aspects of this disclosure.

Referring now to FIG. 6, illustrated is an example computer device 600 in accordance with aspects of the disclosure. The computer device 600 can represent a single computing device, multiple computing devices, a distributed computing system, or at least a portion of a computing network, for example. The computer device 600 may be configured as a quantum computer, a classical computer, or a combination of quantum and classical computing functions.

In one example, the computer device 600 may include a processor 610 for carrying out processing functions associated with one or more of the features described herein. The processor 610 may include a single or multiple set of processors or multi-core processors. Moreover, the processor 610 may be implemented as an integrated processing system and/or a distributed processing system. The processor 610 may include a central processing unit (CPU), a quantum processing unit (QPU), a graphical processing unit (GPU), or combination of those types of processors. Aspects of the processor 610 may be implemented using trapped ions in the ion trap, such as the ion trap 570, for example.

In an example, the computer device 600 may include a memory 620 for storing instructions executable by the processor 610 for carrying out the functions described herein. For example, the computer device 600 may be used to control or operate aspects of the optical alignment system 535 described above. In an implementation, for example, the memory 620 may correspond to a computer-readable storage medium that stores code or instructions to perform one or more of the functions or operations described herein, including functions or operations associated with the optical alignment system 535. In one example, the memory 620 may include one or more memory qubits.

Further, the computer device 600 may include a communications component 630 that provides for establishing and maintaining communications with one or more parties utilizing hardware, software, and services as described herein. The communications component 630 may carry communications between components on the computer device 600, as well as between the computer device 600 and external devices, such as devices located across a communications network and/or devices serially or locally connected to computer device 600. For example, the communications component 630 may include one or more buses, and may further include transmit chain components and receive chain components associated with a transmitter and receiver, respectively, operable for interfacing with external devices.

Additionally, the computer device 600 may include a data store 640, which can be any suitable combination of hardware and/or software, that provides for mass storage of information, databases, and programs employed in connection with implementations described herein. For example, the data store 640 may be a data repository for operating system 660 (e.g., classical OS, or quantum OS). In one implementation, the data store 640 may include the memory 620.

The computer device 600 may also include a user interface component 650 operable to receive inputs from a user of the computer device 600 and further operable to generate outputs for presentation to the user or to provide to a different system (directly or indirectly). The user interface component 650 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 650 may include one or more output devices, including but not limited to a display, a speaker, a haptic feedback mechanism, a printer, any other mechanism capable of presenting an output to a user, or any combination thereof.

In an implementation, the user interface component 650 may transmit and/or receive messages corresponding to the operation of the operating system 660. In addition, the processor 610 may execute the operating system 660 and/or applications or programs, and the memory 620 or the data store 640 may store them.

When the computer device 600 is implemented as part of a cloud-based infrastructure solution, the user interface component 650 may be used to allow a user of the cloud-based infrastructure solution to remotely interact with the computer device 600.

The computer device 600 can implement one or more of the optical systems described herein, including optical systems (e.g., the laser 110) for which one or more optical devices or components (e.g., the output optical coupler 205) need to be removed and replaced with a different optical device or component (e.g., the output optical coupler 207). These replacements may be made for maintenance purposes (e.g., to replace a faulty device) and/or for improvement purposes (e.g., to replace a device with another having enhanced functionality).

Figure 7:
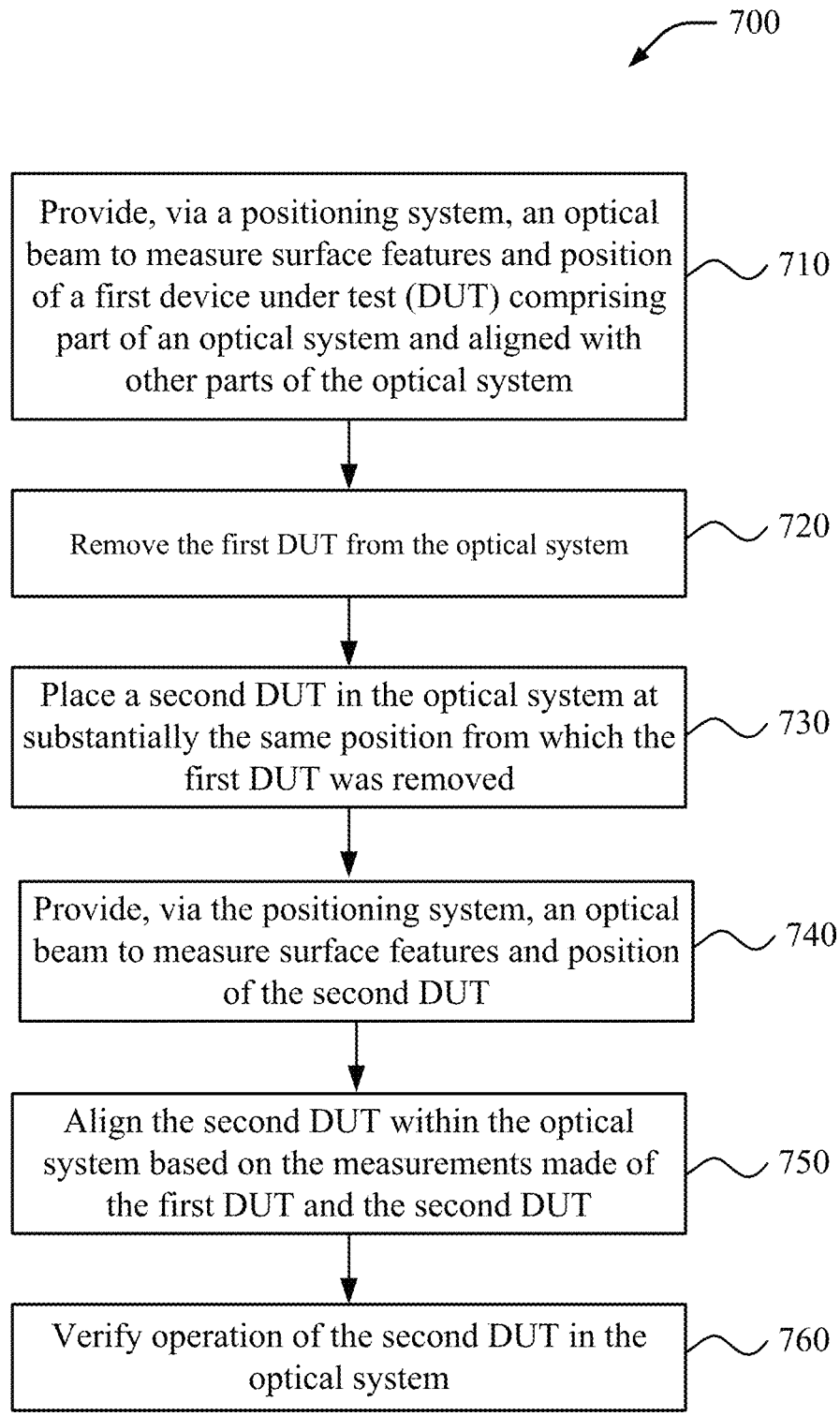
FIG. 7 is a flow chart illustrating an example of a method for optical alignment in accordance with aspects of this disclosure

FIG. 7 is a flow chart illustrating an example of a method 700 for optical alignment in an optical system. The method 700 may be performed in connection with an optical system that is part of the QIP system 505 or of the computer device 600 described above. The method 700 may be controlled by computer system similar to the one described in connection with the computer device 600.

At block 710, the method 700 includes providing, via a positioning system (e.g., the positioning system 536 with positioning component(s) 305), an optical beam (e.g., probing optical beam) to measure surface features and position of a first DUT (e.g., an optical device under test) comprising part of the optical system and aligned with other parts of the optical system.

At block 720, the method 700 includes removing the first DUT from the optical system (e.g., from the laser cavity 120 of the laser 110).

At block 730, the method 700 includes placing a second DUT (e.g., a replacement optical device under test) in the optical system at substantially the same position from which the first DUT was removed.

At block 740, the method 700 includes providing, via the positioning system, an optical beam to measure surface features and position of the second DUT.

At block 750, the method 700 includes aligning the second DUT within the optical system based on the measurements made of the first DUT and the second DUT.

At block 760, the method 700 includes verifying operation of the second DUT in the optical system.

In an aspect of the method 700, providing, via the positioning system, the optical beam to measure surface features and position of the first DUT includes adjusting one or more positional degrees of freedom and/or angular position of the positioning component to place the optical beam on a same axis as the first DUT. For example, the lateral and/or vertical positions of the measurement tool probe arm 340, the vertical arm 345, and/or the mirror 347 may be adjusted. In some examples, the adjustment may involve any one or more of six degrees of freedom and/or angular positioning.

In an aspect of the method 700, providing, via the positioning system, the optical beam to measure surface features and position of the second DUT includes adjusting one or more positional degrees of freedom and/or angular position of the positioning component to place the optical beam on a same axis as the second DUT. For example, the lateral and/or vertical positions of the measurement tool probe arm 340, the vertical arm 345, and/or the mirror 347 may be adjusted. In some examples, the adjustment may involve any one or more of six degrees of freedom and/or angular positioning.

In an aspect of the method 700, each of the optical beam to measure surface features and position of a first DUT and the optical beam to measure surface features and position of the second DUT includes a collimated optical beam sensitive to angular displacements, a focused optical beam sensitive to axial displacement, or both.

In an aspect of the method 700, the positioning system includes a first positioning component and a second positioning component, the optical beam to measure surface features and position of the first DUT includes a first optical beam provided by the first positioning component to one side of the first DUT and a second optical beam provided by the second positioning component to another side of the first DUT, the first optical beam being a collimated optical beam and the second optical beam being a focused optical beam, and the optical beam to measure surface features and position of the second DUT includes a first optical beam provided by the first positioning component to one side of the second DUT and a second optical beam provided by the second positioning component to another side of the second DUT, the first optical beam being a collimated optical beam and the second optical beam being a focused optical beam. In one example, for the first DUT, the first optical beam provided by the first positioning component and the second optical beam provided by the second positioning component are opposite to each other. In another example, for the first DUT, the first optical beam provided by the first positioning component and the second optical beam provided by the second positioning component are 90 degrees from each other. In another example, for the second DUT, the first optical beam provided by the first positioning component and the second optical beam provided by the second positioning component are opposite to each other. In yet another example, for the second DUT, the first optical beam provided by the first positioning component and the second optical beam provided by the second positioning component are 90 degrees from each other.

In an aspect of the method 700, providing, via the positioning system, the optical beam to measure surface features and position of the first DUT includes measuring the surface features and position of the first DUT, generating an output optical beam that includes information about the surface features and position of the first DUT, and providing the output optical beam to a detector to analyze the information about the surface features and position of the first DUT.

In an aspect of the method 700, providing, via the positioning system, the optical beam to measure surface features and position of the second DUT includes measuring the surface features and position of the second DUT, generating an output optical beam that includes information about the surface features and position of the second DUT, and providing the output optical beam to a detector to analyze the information about the surface features and position of the second DUT.

In an aspect of the method 700, aligning the second DUT based on the measurements made of the first DUT and the second DUT includes adjusting one or more positional degrees of freedom of the second DUT to ensure that the surface features and position of the second DUT match the surface features and position of the first DUT.

In an aspect of the method 700, the first DUT is a first optical device and the second DUT is a second optical device configured to provide the same or additional functionalities to those provided by the first optical device.

In an aspect of the method 700, the first DUT is an optical device having a specular reflective surface and the second DUT is an optical device also having a specular reflective surface.

In an aspect of the method 700, the first DUT is a partially transmissive optical device and the second DUT is also a partially transmissive optical device.

In an aspect of the method 700, the surface features include one or more of surface curvature, angle, or tilt.

In an aspect of the method 700, the first DUT is a diffractive optical element and the second DUT is also a diffractive optical element.

In an aspect of the method 700, the first DUT is a polarization control element and the second DUT is also a polarization control element. The polarization control element can include at least one polarizer, at least one waveplate, or a combination thereof.

In an aspect of the method 700, the first DUT is a complex optical assembly including multiple optical elements and the second DUT is also a complex optical assembly. The complex optical assembly can include at least one retro-reflector, at least one complex lens, or a combination thereof.

In an aspect of the method 700, removing the first DUT from the optical system includes removing the first DUT in situ while remaining devices in the optical system are maintained in place, and placing the second DUT in the optical system at substantially the same position from which the first DUT was removed includes placing the second DUT in situ while the remaining devices in the optical system are still maintained in place.

In an aspect of the method 700, the optical system is a laser, the first DUT is a first output optical coupler, and the second DUT is a second output optical coupler with additional functionalities to those of the first output optical coupler.

In an aspect of the method 700, the optical system is a laser, the first DUT is a first active crystal, a first non-linear element, or a first polarization control element, and the second DUT is respectively a second active crystal, a second non-linear element, or a second polarization control element with additional functionalities. The first non-linear element can include a saturable absorber used when the laser is a mode-locked laser or a doubling crystal used for intra-cavity double lasers in the laser and the second non-linear element can respectively include a saturable absorber used when the laser is a mode-locked laser or a doubling crystal used for intra-cavity double lasers in the laser.

In an aspect of the method 700, the method further includes performing one or more subsequent alignments of the second DUT based on the measurements made of the first DUT and the second DUT if operation of the second DUT fails verification.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. An optical alignment system, the system comprising:
   a positional component including:
      a laser input port configured to receive an optical beam;
      one or more alignment mirrors configured to redirect the optical beam to a beam splitter;
      the beam splitter configured to redirect the optical beam to a measurement tool probe;
      the measurement tool probe configured to redirect the optical beam to a device under test (DUT) within an optical system; and
   a long travel translation stage configured to align the optical beam from the measurement tool probe with the DUT,
   wherein:
      the measurement tool probe is further configured to receive an output optical beam from the DUT,
      the beam splitter is further configured to direct the output optical beam to an output of the positional component,
      the optical system is a laser, and
      the positional component is configured to be at least partially positioned within a laser cavity of the laser to provide the optical beam to measure surface features, position, or both of the DUT while the DUT is within the laser cavity of the laser.

2. The optical alignment system of claim 1, further comprising:
   a detector configured to detect and process the output optical beam directed from the beam splitter; and
   an analyzer configured to analyze measurement information related to surface features, position, or both of the DUT obtained from the processing of the output optical beam.

3. The optical alignment system of claim 1, further comprising:
   a plate to which the laser input port, the one or more alignment mirrors, and the beam splitter are mechanically attached, and
   a sliding component to which the plate is attached and is configured to slide along the long travel translation stage.

4. The optical alignment system of claim 1, wherein the positional component is a first positional component and the optical beam provided by the first positional component to the DUT is a first optical beam, the system further comprising:

a second positional component that includes a second laser input port, one or more second alignment mirrors, a second beam splitter, a second measurement tool probe, and a second long travel translation stage, wherein an optical beam provided by the second positional component to the DUT is a second optical beam.

5. The optical alignment system of claim 4, wherein the first optical beam is a collimated optical beam and the second optical beam is a focused optical beam.

6. The optical alignment system of claim 4, wherein the first optical beam is applied to one side of the DUT and the second optical beam is applied to another side of the DUT.

7. The optical alignment system of claim 4, wherein the first optical beam and the second optical beam are applied at 90 degrees from each other.

8. The optical alignment system of claim 4, wherein the first optical beam and the second optical beam are applied opposite from each other.

9. The optical alignment system of claim 4, wherein:
the output optical beam of the first positional component is a first output optical beam, and
an output optical beam received from the DUT by the second positional component is a second output optical beam,
the first output optical beam and the second output optical beam are optically combined and provided to a detector for detection and processing.

10. The optical alignment system of claim 1, wherein the long travel translation stage is configured to travel vertically to:
move the measurement tool probe to align the optical beam from the measurement tool probe with the DUT to measure one or more of surface features and position of the DUT, and
move the measurement tool probe away from alignment with the DUT when not making measurements.

11. The optical alignment system of claim 1, wherein the long travel translation stage is configured to align the optical beam from the measurement tool probe with an axis of the DUT.

12. The optical alignment system of claim 1, wherein the long travel translation stage is configured to align the optical beam from the measurement tool probe with the DUT to measure surface features, position, or both of the DUT.

13. The optical alignment system of claim 12, wherein the surface features include one or more of surface curvature, angle, or tilt.

14. The optical alignment system of claim 1, wherein:
the DUT is an optical device having a specular surface, and
the measurement tool probe is further configured to be aligned and receive the output optical beam from the DUT having the specular surface.

15. The optical alignment system of claim 1, wherein:
the DUT is a partially transmissive optical device, and
the measurement tool probe is further configured to be aligned and receive the output optical beam from the partially transmissive optical device.

16. The optical alignment system of claim 1, wherein:
the DUT is a diffractive optical element, and
the measurement tool probe is further configured to be aligned and receive the output optical beam from the diffractive optical element.

17. The optical alignment system of claim 1, wherein:
the DUT is a polarization control element, and
the measurement tool probe is further configured to be aligned and receive the output optical beam from the polarization control element.

18. The optical alignment system of claim 1, wherein:
the DUT is an optical assembly, and
the measurement tool probe is further configured to be aligned and receive the output optical beam from the optical assembly.

19. The optical alignment system of claim 18, wherein the optical assembly includes at least one retro-reflector, at least one complex lens, or a combination thereof.

20. An optical alignment system, the system comprising:
a first positional component including:
a laser input port configured to receive a first optical beam;
one or more alignment mirrors configured to redirect the first optical beam to a first beam splitter;
the first beam splitter configured to redirect the first optical beam to a first measurement tool probe;
the first measurement tool probe configured to redirect the first optical beam to a device under test (DUT) within an optical system;
a first long travel translation stage configured to align the first optical beam from the first measurement tool probe with the DUT; and
a second positional component including:
a second laser input port configured to receive a second optical beam;
one or more second alignment mirrors configured to redirect the second optical beam to a second beam splitter;
the second beam splitter configured to redirect the second optical beam to a second measurement tool probe;
the second measurement tool probe configured to redirect the second optical beam to the DUT within the optical system; and
a second long travel translation stage configured to align the second optical beam from the second measurement tool probe with the DUT,
wherein:
at least one of the first measurement tool probe or the second measurement tool probe is further configured to receive an output optical beam from the DUT, and
at least one of the first beam splitter or the second beam splitter is further configured to direct the output optical beam to an output of the first positional component or the second positional component.

* * * * *